United States Patent [19]
Azegami et al.

[11] Patent Number: 6,104,550
[45] Date of Patent: *Aug. 15, 2000

[54] CONTROL METHOD FOR ZOOM LENS CAMERA AND ZOOM LENS CAMERA

[75] Inventors: Kazuyoshi Azegami, Tokyo; Takamitsu Sasaki, Saitama; Kazunori Ishizuka, Kanagawa, all of Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/181,602

[22] Filed: Oct. 28, 1998

[30] Foreign Application Priority Data

Oct. 31, 1997 [JP] Japan ................................. 9-300804

[51] Int. Cl.$^7$ .................................................. G02B 15/14
[52] U.S. Cl. ........................................... 359/696; 359/694
[58] Field of Search .................................... 359/694, 696, 359/697, 698, 695; 396/79, 83

[56] References Cited

U.S. PATENT DOCUMENTS 5,689,738  11/1997  Uziie et al. ................................ 396/79
5,764,422  6/1998  Miyamoto ................................ 359/696

FOREIGN PATENT DOCUMENTS 0560646  9/1993  European Pat. Off. .
5-232367  9/1993  Japan .

Primary Examiner—Hung Xuan Dang
Attorney, Agent, or Firm—Greenblum & Bernstein, P.L.C.

[57] ABSTRACT

A control method for a zoom lens camera which includes a focal length detection mechanism which detects the focal length divided into a finite number of steps; and a focus drive mechanism which drives the focusing lens group to move the same to the finite number of steps, the method includes measuring actual focal points of the zoom lens system at the wide angle extremity and the telephoto extremity, whereby any deviations of the focal points from a focal plane are obtained; converting the deviations to a displacement of said focusing lens group at each focal length of said finite number of steps, taking into account the focus sensitivity of said focusing lens group, wherein the data of said displacement is stored in a memory; and driving the focusing lens group, upon focusing, in accordance with the displacement of said focusing lens group determined based on object distance data and focal length data, in addition to the stored displacement data. A zoom lens camera to which the control method is applied is also disclosed.

12 Claims, 9 Drawing Sheets

CONTROL METHOD FOR ZOOM LENS CAMERA AND ZOOM LENS CAMERA

BACKGROUND OF THE INVENTION

1. Field of the Invention

The present invention relates to a zoom lens camera and a control method therefor; and in particular, relates to a control method in which the zoom lens is controlled taking into account a zoom adjustment and a back focus adjustment (fB adjustment). The present invention also relates to a zoom lens camera which is controlled in accordance with the control method.

2. Description of the Related Art

In a zoom lens, a zoom adjustment in which no movement of the position of the focal point of the lens takes place during the zooming operation and a back focus adjustment (fB adjustment) in which the focal point is identical to a focal plane of a camera must be carried out. In general, in the zoom adjustment, the focal point at a telephoto extremity is made identical to that at a wide angle extremity. In the back focus adjustment, the position of the focal point after completion of the zoom adjustment is made identical to the position of the focal plane (rail surface) of the camera. These adjustments are carried out by mechanically moving the lens position in a prior art. However, space for accommodating a mechanical Adjustment device is needed and the adjustments are troublesome.

SUMMARY OF THE INVENTION

It is an object of the present invention to provide a zoom lens camera in which no mechanical zoom adjustment or fB adjustment is necessary, and a simple control method therefor.

The present invention is applied to a zoom lens camera which includes a zoom lens system having a control method for a zoom lens camera including: a zoom lens system including at least two variable power lens groups, wherein one of the variable power lens groups is provided on the object side functioning as a focusing lens group; a focal length detection mechanism which detects the focal length of the zoom lens system by dividing the focal length into a finite number of steps; and a focus drive mechanism which drives the focusing lens group to selectively move the focusing lens group to a finite number of steps. The method includes: measuring actual focal points of the zoom lens system at least at the wide angle extremity and the telephoto extremity upon assembly, whereby any deviations of the measured focal points from a focal plane of the zoom lens camera in an optical axis direction are obtained; converting the deviations in the optical axis direction to a displacement of the focusing lens group at each focal length of the finite number of steps, taking into account the focus sensitivity of the focusing lens group which varies depending on the focal length of the zoom lens system, wherein the data of the displacement is stored in a memory; and driving the focusing lens group, upon focusing, by the focus drive mechanism in accordance with the displacement of the focusing lens group determined based on object distance data and focal length data, in addition to the stored displacement data.

Preferably, the zoom lens camera includes a mechanism which mechanically adjusts the position of a rear lens group, the rear lens group being one of the two lens groups and being provided behind the focusing lens group, and wherein the control method includes an additional step between the converting step and the driving step in which the position of the rear lens group is adjusted.

Preferably, the position of the second lens group is adjusted so that the displacement data of the focusing lens group which is stored at the converting step is reduced.

Preferably, the zoom lens system includes a first, second and third lens group, in which the second group and the third lens group include the focusing lens group and the rear lens group, respectively.

According to another aspect of the present invention, there is provided a zoom lens system including at least two variable power lens groups, one of the variable power lens groups being provided on the object side functioning as a focusing lens group; a focal length detection mechanism which detects the focal length of the zoom lens system which is divided into a finite number of steps; a focus drive mechanism which drives the focusing lens group to selectively move the focusing lens group to a finite number of steps; a memory in which measured deviations of the actual focal points of the zoom lens system, upon assembly, at least at the wide angle extremity and the telephoto extremity from a focal plane of the zoom lens camera are stored; a calculation device for converting the measured deviations of the actual focal points from the focal plane of the zoom lens camera in an optical axis direction into a displacement of the focusing lens group at each focal length of the finite number of steps, taking into account a focus sensitivity of the focusing lens group which varies depending on the focal length of the zoom lens system; and a control device for causing the focus drive mechanism to drive the focusing lens group, upon focusing, in accordance with the displacement data of the focusing lens group obtained by the calculation device in addition to the displacement data of the focusing lens group determined based on focal length data and object distance data.

Preferably, the zoom lens camera further includes a mechanism which mechanically adjusts the position of a rear lens group, the rear lens group being one of the two lens groups and being provided behind the focusing lens group.

Preferably, the zoom lens system includes a first, second and third lens group, in which the second group and the third lens group include the focusing lens group and the rear lens group, respectively.

Preferably, the rear lens group includes a lens group which is closest to an aperture, the aperture defining an exposure area to a film.

Preferably, the zoom lens camera further includes a lens frame which supports the rear lens group, the lens frame including, on an outer periphery thereof, a male thread, and a lens support ring which is provided on an inner periphery thereof with a female thread. The female thread engages with the male thread, wherein the position of the rear lens group is adjustable via the rotation of the lens frame.

Preferably, the lens frame is provided on an outer periphery thereof with a plurality of engaging portions to which a rotatable jig is engaged to rotate the lens frame.

According to another aspect of the present invention, there is provided a control method for a zoom lens camera having a zoom lens system including a first, a second and a third lens group in this order from the object side, the second lens group functioning as a focusing lens group; a focal length detection mechanism which detects the focal length of the zoom lens system by dividing the focal length into a finite number of steps; and a focus drive mechanism which drives the focusing lens group to selectively move the focusing lens group to a finite number of steps. The method includes: a first step in which actual focal points of the zoom lens system at least at the wide angle extremity and the telephoto extremity are measured upon assembly, and the deviations of the measured focal points from a focal plane of the zoom lens camera in an optical axis direction are obtained; a second step in which the deviations in the optical axis direction are converted to a displacement of the focusing lens group at each focal length of the finite number of steps, taking into account the focus sensitivity of the focusing lens group which varies depending on the focal length of the zoom lens system, and the data of the displacement is stored in a memory; and a third step in which, upon focusing, the focusing lens group is driven by the focus drive mechanism in accordance with the displacement of the focusing lens group determined based on object distance data and focal length data, in addition to the stored displacement data.

Preferably, the zoom lens camera includes a mechanism which mechanically adjusts the position of the third lens group, and wherein the control method includes an additional step between the second and third step in which the position of the third lens group is adjusted.

The present disclosure relates to subject matter contained in Japanese Patent Application No. 9-300804 (filed on Oct. 31, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
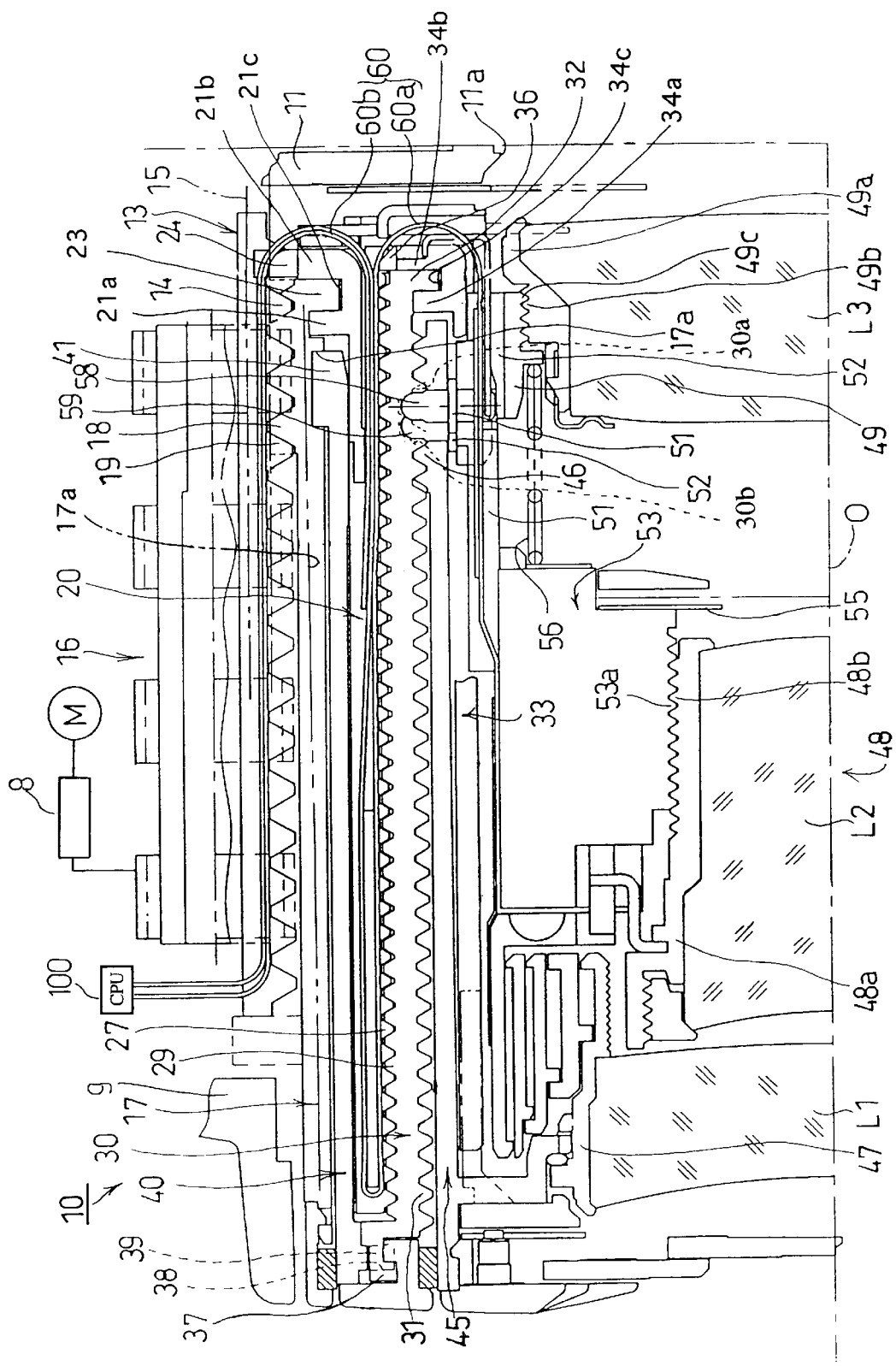
FIG. 1 is a longitudinal sectional view of a lens barrel of a zoom lens camera in a retracted position, according to the present invention.
Figure 2:
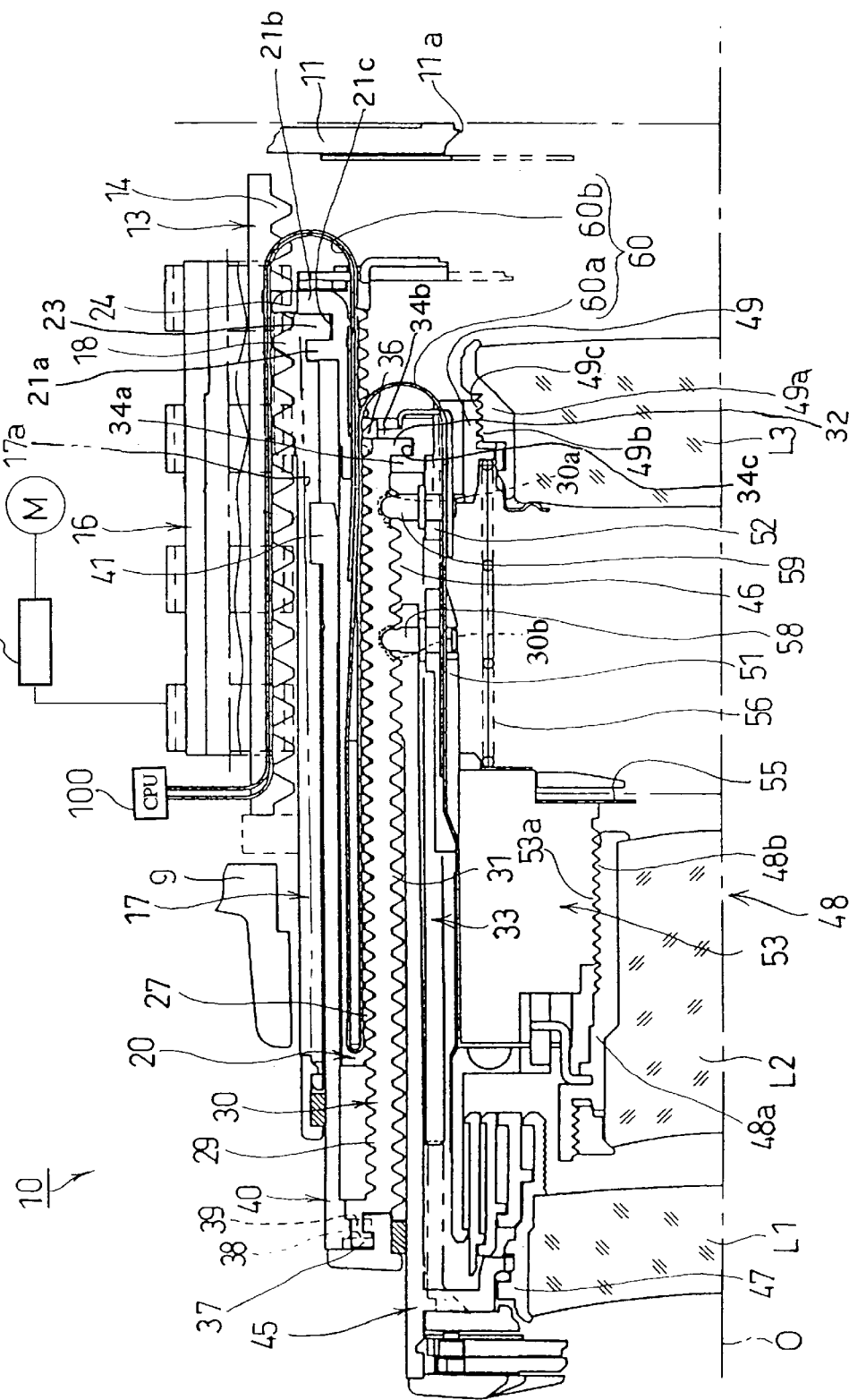
FIG. 2 is a longitudinal sectional view of the zoom lens barrel shown in FIG. 1, at a wide angle extremity.
Figure 3:
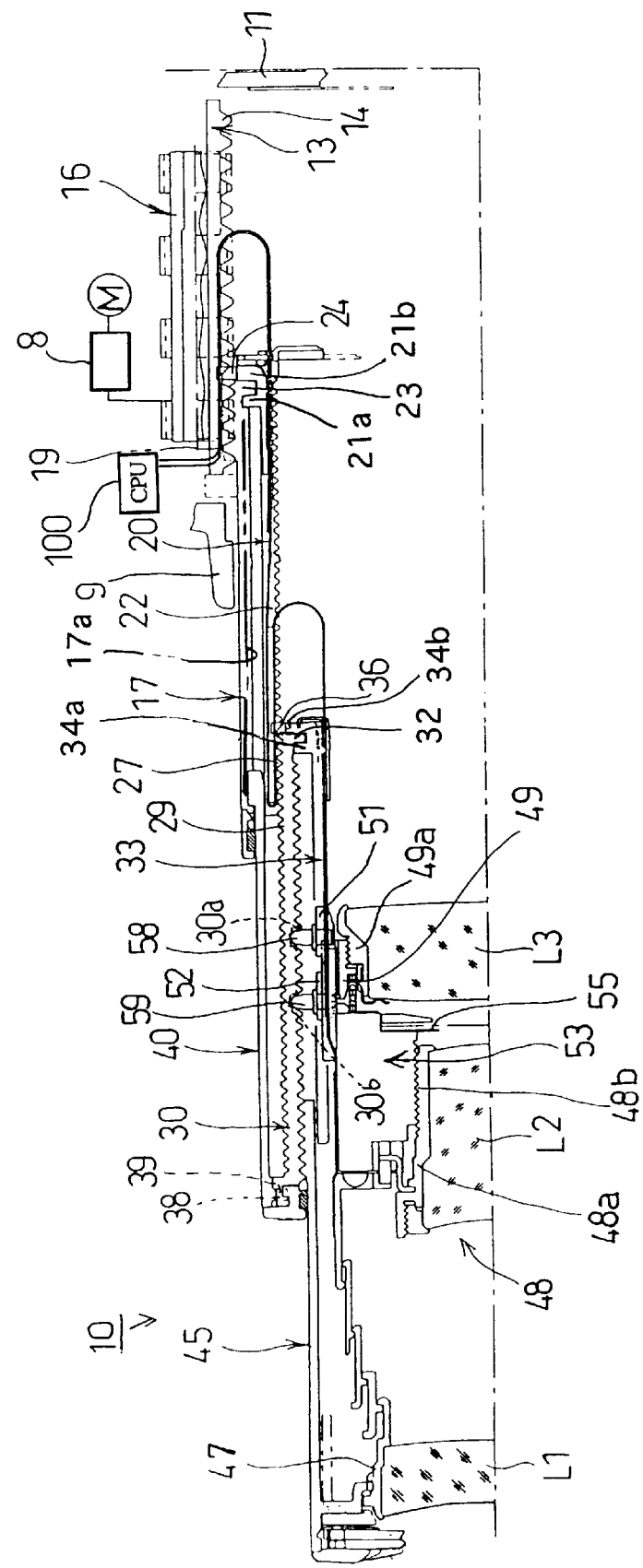
FIG. 3 is a longitudinal sectional view of the zoom lens barrel shown in FIG. 1, at a telephoto extremity.

The whole structure and operation of a zoom lens camera having a zoom lens barrel 10 will be discussed below with reference to FIGS. 1 through 4 and FIG. 7, prior to an explanation of the feature of the zoom lens camera and its control method according to the present invention.

A zoom lens barrel 10 is secured to a camera body 9 of a zoom compact camera 5 and is composed of a first lens group L1, a second lens group L2, and a third lens group L3. The zooming operation is carried out by varying the distances between the three lens groups and the distances between a film surface and each lens group. The focusing operation is carried out by moving the second lens group (focusing lens group) L2 in a direction parallel with the optical axis O.

An aperture plate 11 is secured in the camera body 9 so that the inner edge of the aperture plate 11 defines an aperture 11a which determines the exposure area for a film. A stationary barrel 13 is secured to the camera body 9 in front of the aperture plate 11. The stationary barrel 13 is provided on the inner peripheral surface thereof with a female helicoid (internal helicoid) 14 and three linear movement guide grooves 15 which extend in parallel with the optical axis O, and which are circumferentially spaced from one another.

The stationary barrel 13 is provided with a recess 13a (FIG. 4) which extends in parallel with the optical axis O, so that a zoom gear 16 is attached adjacent the recess 13a. The zoom gear 16 is supported so as to rotate about an axis substantially parallel with the optical axis O and has pinions whose teeth project into the inside of the stationary barrel 13 through the recess 13a. A zoom motor M is provided in the camera body 9, so that the rotation of the drive shaft of the zoom motor M is transmitted to the zoom gear 16 through a zoom gear train 8.

The female helicoid 14 of the stationary barrel 13 is engaged by a male helicoid (external helicoid) 18 formed on the outer peripheral surface of a first outer barrel 17 at the rear end thereof. The width of the male helicoid 18 in the direction of the optical axis is such that the male helicoid 18 is not exposed to the outside when the first outer barrel 17 is extended to the most advanced position. The first outer barrel 17 is provided, on the outer peripheral surface thereof, on which the male helicoid 18 is formed, with a plurality of outer peripheral gear segments 19 that extend in parallel with the male helicoid 18. The teeth of each outer peripheral gear segments 19 extend in parallel with the optical axis O and are engaged by the zoom gear 16. The first outer barrel 17 is provided on the inner peripheral surface thereof with three rotation transmission grooves 17a which extend from the front end to the rear end of the first outer barrel 17 in the direction parallel with the optical axis O.

A first linear movement guide ring 20 is provided in the first outer barrel 17. The first linear movement guide ring 20 is provided, on the outer peripheral surface at the rear end thereof, with a pair of circumferentially parallel flanges 21a and 21b that extend in a radial direction. The flanges 21a and 21b define therebetween an annular groove 21c whose center is located on the optical axis O. The first outer barrel 17 is provided, on the inner peripheral surface at the rear end thereof, with a plurality of engagement projections 23 (only one of which is shown in the drawings, see FIGS. 1 through 3) that are spaced from one another in a circumferential direction and project in the radial and inward direction. The thickness of each projection 23 is such that the projections are snugly fitted in the annular groove 21c formed in the first linear movement guide ring 20 in the direction parallel with the optical axis O so as to slide therein in the circumferential direction. Consequently, when the engagement projections 23 are fitted in the annular groove 21c, the first outer barrel 17 and the first linear movement guide ring 20 are interconnected so as not to move relative to each other in the axial direction but to rotate relative to each other. Note that the coupling composing the engagement projections 23 and the annular groove 21c is in the form of a bayonet coupling, and can be disconnected from or connected to one another at a predetermined relative angular position.

Figure 4:
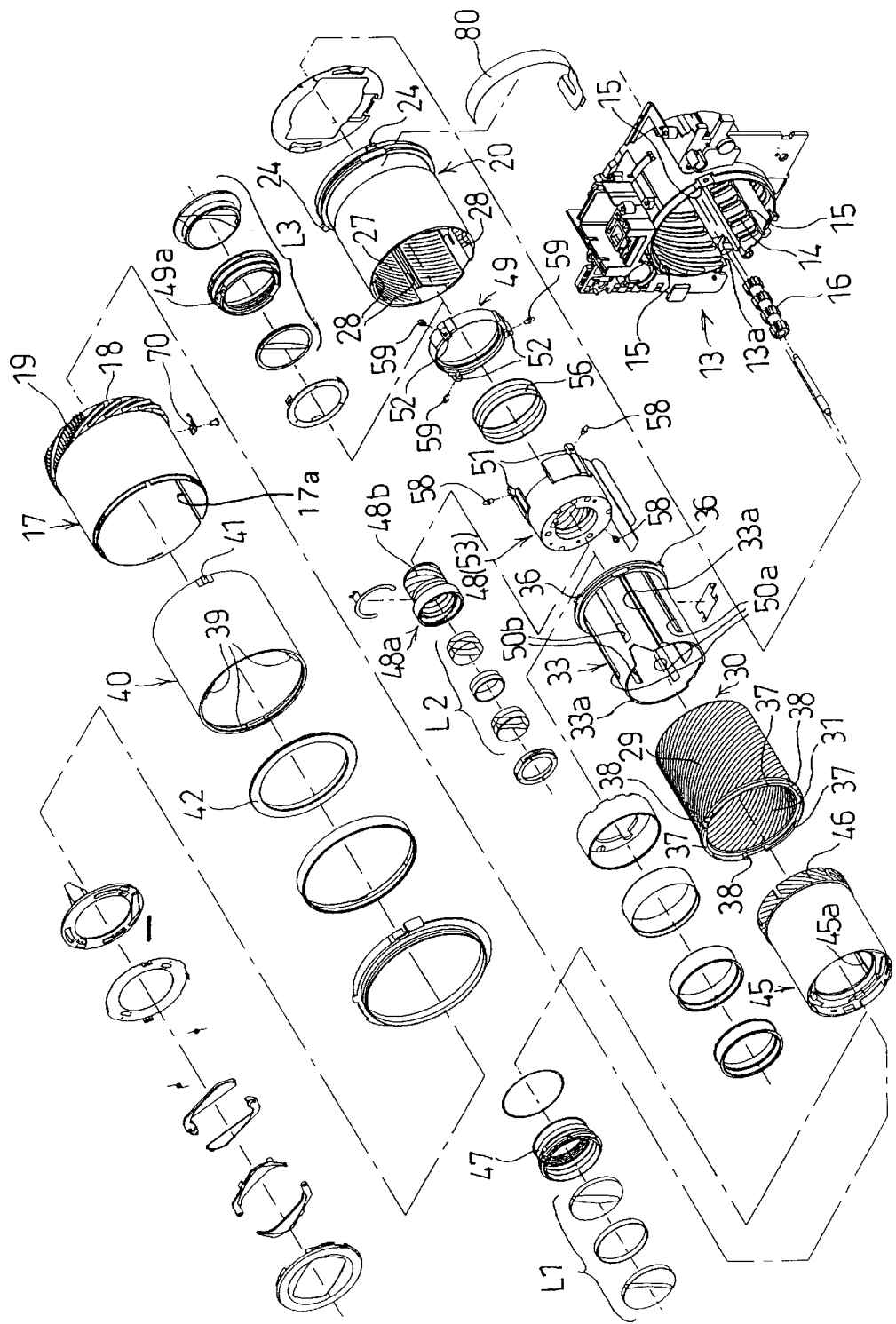
FIG. 4 is an exploded perspective view of a zoom lens barrel according to the present invention.

The first linear movement guide ring 20 is provided on the outer peripheral surface at the rear end thereof with three radially projecting linear movement guide projections 24 (only two of which are shown in FIG. 4) that are spaced from one another at a predetermined distance in the circumferential direction. The linear movement guide projections 24 are slidably engaged in linear movement guide grooves 15 formed on the inner peripheral surface of the stationary barrel 13. Consequently, the first linear movement guide ring 20 is moved together with the first outer barrel 17 in the axial direction without rotating relative to the stationary barrel 13 about the optical axis O. Thus, the linear movement of the first linear movement guide ring 20 is guided.

The first outer barrel 17 and the first linear movement guide ring 20 constitute a first feed barrel (extension barrel) of the zoom lens barrel 10. In the first feed barrel, when the zoom gear 16 is rotated in a predetermined direction by the zoom motor M, the first outer barrel 17 is rotated through the outer peripheral gear segments 19, so that the first outer barrel 17 is advanced from the stationary barrel 13 while rotating in accordance with the relationship between the female helicoid 14 and the male helicoid 18. At the same time, the first linear movement guide ring 20 which is supported to rotate relative to the first outer barrel 17 is moved together with the first outer barrel 17 relative to the stationary barrel 13 in the axial direction parallel with the optical axis O while being linearly guided.

The first linear movement guide ring 20 is provided on its inner peripheral surface with a female helicoid 27 whose direction is the same as the female helicoid 14. The first linear movement guide ring 20 is also provided on its inner peripheral surface with three linear movement guide grooves 28 that extend in parallel with the optical axis O and that are spaced from one another at a predetermined angular distance in the circumferential direction.

A drive cam ring 30 is provided in the first linear movement guide ring 20. The drive cam ring 30 is provided on the outer peripheral surface thereof with a male helicoid 29 which engages with the female helicoid 27. The male helicoid 29 is formed on the entire peripheral surface of the drive cam ring 30. Also, the drive cam ring 30 is provided on its entire inner peripheral surface with a female helicoid 31 whose inclination direction is opposite to that of the male helicoid 29.

A second linear movement guide ring 33 is provided in the drive cam ring 30. The second linear movement guide ring 33 is provided, on the outer peripheral surface at the rear end thereof, with a pair of circumferentially parallel flanges 34a and 34b that extend in the radial and outward direction. The flanges 34a and 34b define therebetween an annular groove 34c whose center is located on the optical axis O. When the engagement projections 32 of the drive cam ring 30 are fitted in the annular groove 34c, the drive cam ring 30 and the second linear movement guide ring 33 are interconnected so as not to move relative to each other in the axial direction but to rotate relative to each other. Note that the coupling composing the engagement projections 32 and the annular groove 34c is in the form of a bayonet coupling and can be disconnected from or connected to one another at a predetermined relative angular position.

The second linear movement guide ring 33 is provided at the rear end thereof with three linear movement guide projections 36 (only two of them are shown in FIG. 4) at different circumferential positions, that project outward in the radial direction. The linear movement guide projections 36 are slidably engaged in respective linear movement guide grooves 28 formed on the inner peripheral surface of the first linear movement guide ring 20. Consequently, the second linear movement guide ring 33 is linearly guided so as to move relative to the stationary barrel 13 through the first linear movement guide ring 20.

A second outer barrel 40 is located between the first outer barrel 17 and the first linear movement guide ring 20. Three rotation transmission projections 41 (only one of which is shown in FIG. 4) provided on the outer peripheral surface of the second outer barrel 40 at the rear end thereof in different circumferential positions are slidably fitted in three rotation transmission grooves 17a formed on the inner peripheral surface of the first outer barrel 17 and extending in parallel with the optical axis O. Thus, the second outer barrel 40 is guided so as not to relatively rotate but so as to move relative to the first outer barrel 17 along the optical axis O.

The drive cam ring 30 is provided on the front end thereof with a rib 37 having a certain thickness in the radial direction of the drive cam ring 30. The rib 37 is equipped with three cutaway portions 38. The second outer barrel 40 is equipped, on the inner peripheral surface at the front end thereof, with three engaging projections 39 that can be engaged in the cutaway portions 38 of the rib 37 and that project in the radial and inward direction. The drive cam ring 30 and the second outer barrel 40 are interconnected so as not to relatively move in the optical axis direction, and so as not to relatively rotate when the engaging projections 39 are engaged in the cutaway portions 38.

Consequently, when the second outer barrel 40 is rotated in association with the rotation of the first outer barrel 17, the rotation of the drive cam ring 30 takes place. As a result, the drive cam ring 30 integral with the second outer barrel 40 is advanced from the first linear movement guide ring 20 which constitutes a first feed barrel, in accordance with the relationship between the female helicoid 27 and the male helicoid 29.

The drive cam ring 30, the second outer barrel 40 and the second linear movement guide ring 33 constitute a second feed barrel (extension barrel) of the zoom lens barrel 10. When the first outer barrel 17 which constitutes the first feed barrel is rotated and extended from the stationary barrel 13, the second outer barrel 40 is rotated in association with the first outer barrel 17 due to the engagement between the rotation transmission grooves 17a and the rotation transmission projections 41. The drive cam ring 30 to which the rotation of the second outer barrel 40 is transmitted is advanced from the first linear movement guide ring 20 together with the second outer barrel 40, while rotating relative to the stationary barrel 13 in the same direction as the first outer barrel 17, in accordance with the engagement between the female helicoid 27 and the male helicoid 29. At the same time, the second linear movement guide ring 33 which is connected to the drive cam ring 30 so as to rotate relative thereto is moved in the direction of the optical axis together with the drive cam ring 30 while being guided by the first linear movement guide ring 20 in accordance with the engagement between the linear movement guide projections 36 and the linear movement guide grooves 28.

A third outer barrel 45 is provided in the drive cam ring 30. The second linear movement guide ring 33 is located in the third outer barrel 45. The second linear movement guide ring 33 is provided on the outer peripheral surface thereof with a plurality of linear movement guide grooves 33a extending in parallel with the optical axis O. The third outer barrel 45 is provided on its inner peripheral surface with a plurality of linear movement guide projections 45a (only one of which is shown in FIG. 4) which can be engaged by the linear movement guide grooves 33a. The linear movement guide projections 45a provided on the third outer barrel 45 are slidably engaged by the linear movement guide grooves 33a provided on the second linear movement guide ring 33, so that the third outer barrel 45 can be moved in the direction parallel with the optical axis O relative to the second linear movement guide ring 33 through the engagement of the linear movement slide grooves 33a and the linear movement guide projections 45a.

The third outer barrel 45 is provided on the outer peripheral surface at the rear end thereof with a male helicoid 46 which engages with the female helicoid 31 formed on the inner peripheral surface of the drive cam ring 30. When the drive cam ring 30 is rotated, the rotational force is applied to the third outer barrel 45, but the third outer barrel 45 which is linearly guided by the second linear movement guide ring 33 does not rotate together with the drive cam 30. Consequently, the third outer barrel 45 is advanced relative to the drive cam ring 30 while moving in the direction parallel with the optical axis O relative to the stationary barrel 13, in accordance with the male helicoid 46 and the female helicoid 31. Namely, the third outer barrel 45 constitutes a third feed barrel (extension barrel) of the lens barrel. The length of the male helicoid 46 in the direction of the optical axis is such that the male helicoid 46 is not exposed to the outside when the third outer barrel 45 is extended to the maximum extension position.

A first lens frame 47 which holds the first lens group L1 is secured to the third outer barrel 45.

The second linear movement guide ring 33 is provided on the peripheral surface thereof with three axially extending second lens guide through slits 50a which are adapted to guide the second lens group L2 and three axially extending third lens guide through slits 50b which are adapted to guide the third lens group L3. The second lens guide through slits 50a and the third lens guide through slits 50b are alternately arranged in the circumferential direction.

The second lens group L2 is held by a second lens support frame 48a which constitutes a second lens unit 48, and the third lens group L3 is held by a third lens support frame 49a which is supported in the third lens support ring 49. The shutter block 53 of the second lens unit 48 is provided on the outer peripheral surface with three sliding plates 51. The sliding plates 51 are slidably fitted in the second lens guide slits 50a.

Likewise, the third lens support ring 49 is provided on the outer peripheral surface with three sliding plates 52. The sliding plates 52 are slidably fitted in the third lens guide slits 50b. Thus, the second lens unit 48 (second lens support frame 48a) and the third lens support ring 49 (third lens support frame 49a) can be independently slid within the second linear movement guide ring 33 in the direction parallel with the optical axis O. Note that a compression spring 56 is provided between the second lens unit 48 and the third lens support ring 49 to remove a backlash, so that the second lens unit 48 and the third lens support ring 49 are biased forward and rearward, respectively.

The second lens unit 48 supported in the drive cam ring 30 and the third lens support ring 49 are moved in the axial direction in accordance with the feed operation of the zoom lens barrel 10. Namely, the sliding plates 51 of the second lens unit 48 and the sliding plates 52 of the third lens support ring 49 are provided with radially projecting guide pins 58 and 59. The drive cam ring 30 is provided on the inner peripheral surface thereof with predetermined profiles of cam grooves 30a and 30b corresponding to the guide pins 58 and 59. The guide pins 58 and 59 are slidably fitted in the cam grooves 30a and 30b, respectively. The guide grooves 30a which guide the guide pins 58 and the cam grooves 30b which guide the guide pins 59 have a non-linear oblique profile. Consequently, when a relative rotation between the drive cam ring 30 and the second linear movement guide ring 33 occurs, the second lens group L2 (second lens unit 48) and the third lens group L3 (third lens support ring 49) are relatively moved in the direction parallel with the optical axis O, respectively, through the guide pins 58 and 59.

The shutter block 53 of the second lens unit 48 is provided on the shaft portion thereof with a threaded hole 53a in which an external thread 48b of the second lens frame 48a is screw-engaged. The shutter block 53 contains therein a focusing motor (second lens drive motor) M1 of FIG. 7 which is controlled by the CPU 100 within the camera and which, upon focusing, drives the second lens frame 48a due to the engagement between the internal thread 53a and the external thread 48b to thereby move the second lens group L2 to a predetermined position in the direction of the optical axis. The shutter block 53 is provided with shutter blades 55 which function also as a diaphragm and which are opened and closed in accordance with an object brightness signal (information). The shutter block 53 receives drive signals which are used for driving the shutter and the focusing operation, through an FPC (Flexible Printed Circuit) board 60.

Figure 10:
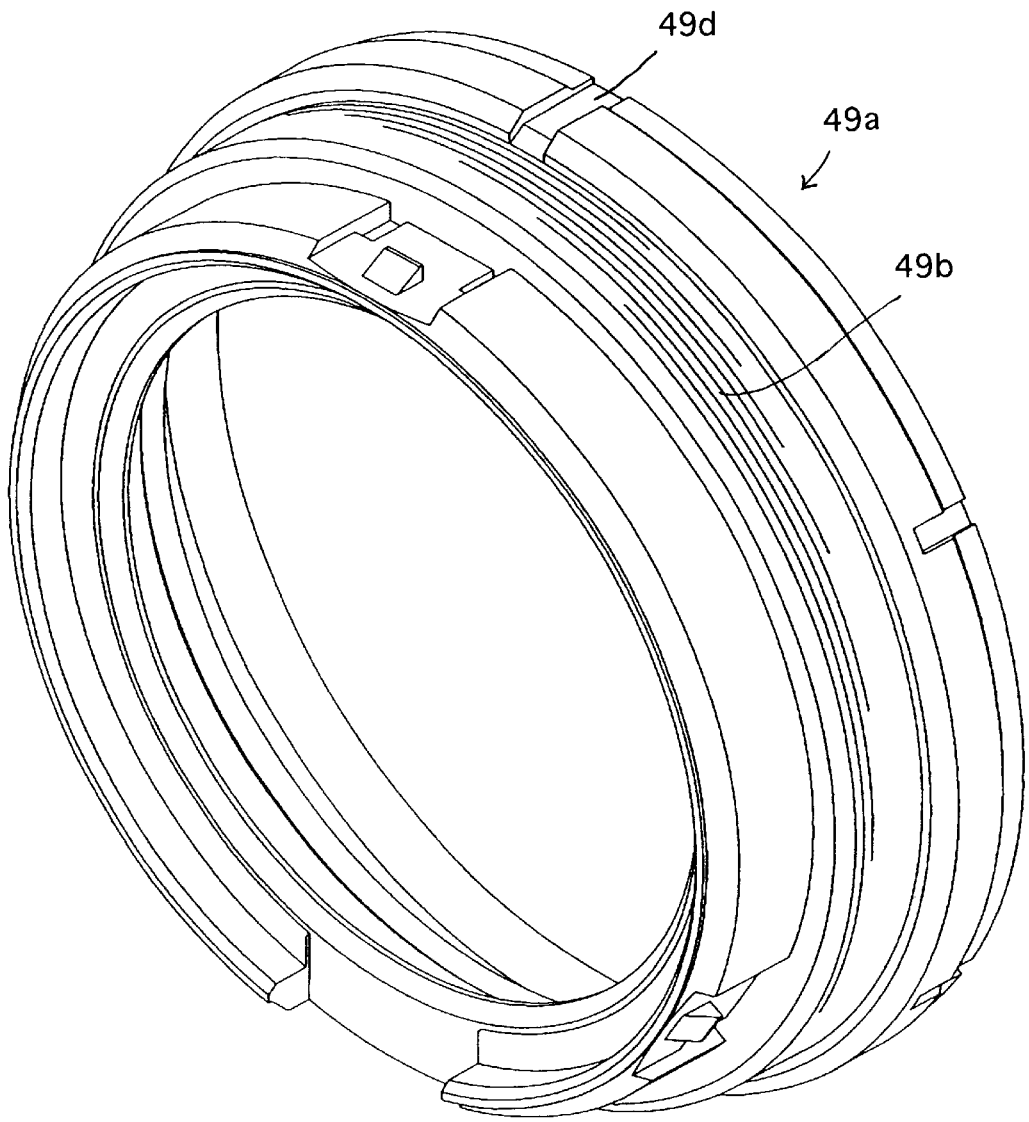
FIG. 10 is a perspective view of a third lens support frame.

The third lens support frame 49a is provided on the outer peripheral surface thereof with an external thread 49b, as best shown in FIG. 10, which engages with the internal thread 49c formed on the third lens support ring 49. The third lens support frame 49a is also provided on the outer peripheral surface thereof with a plurality of recesses 49d spaced in the circumferential direction thereof. A rotating jig (not shown) which is inserted through the aperture 11a from the rear portion of the lens barrel can be engaged with the recesses 49d to rotate the third lens frame 49d. Consequently, upon assembly of the zoom lens barrel 10, the third lens group L3 can be moved in the axial direction in accordance with the relationship between the external thread 49b and the internal thread 49c by rotating the third lens support frame 49a, so that the position of the third lens group L3 relative to the second lens group L2 which is located at a reference position is adjusted. The reference position is an initial position before executing an AF operation and lenses at the reference position focuses on an object located at infinity. The third lens group L3, the rearmost lens group among the three lens groups, is the closest to the aperture 11a and is possible to adjust the position thereof even after completion of assembly.

The zoom lens barrel 10 is provided with a focal length detection mechanism (encoder) in the first feed barrel. The focal length detection mechanism is comprised of a code plate 80 which is adhered to the outer peripheral surface of the first linear movement guide ring 20 and which is elongated in the circumferential direction thereof, and a brush 70 which is inserted in the male helicoid 18 of the first outer barrel 17 so as to come into contact with the code plate 80. Upon zooming, when the first outer barrel 17 and the first linear movement guide ring 20 are relatively rotated, the brush 70 is in sliding contact with the code plate 80 to detect a finite number of steps of the focal length.

The FPC board 60 is composed of a shutter substrate 60a connected to the shutter block 53 and a code plate substrate 60*b* connected to the code plate 80 which is adhered to the outer peripheral surface of the first linear movement guide ring 20. The substrates 60*a* and 60*b* have a length long enough to permit the extension and retraction of the zoom lens barrel 10. The FPC board 60 is connected at the other end to the CPU 100 in the camera body.

Figure 7:
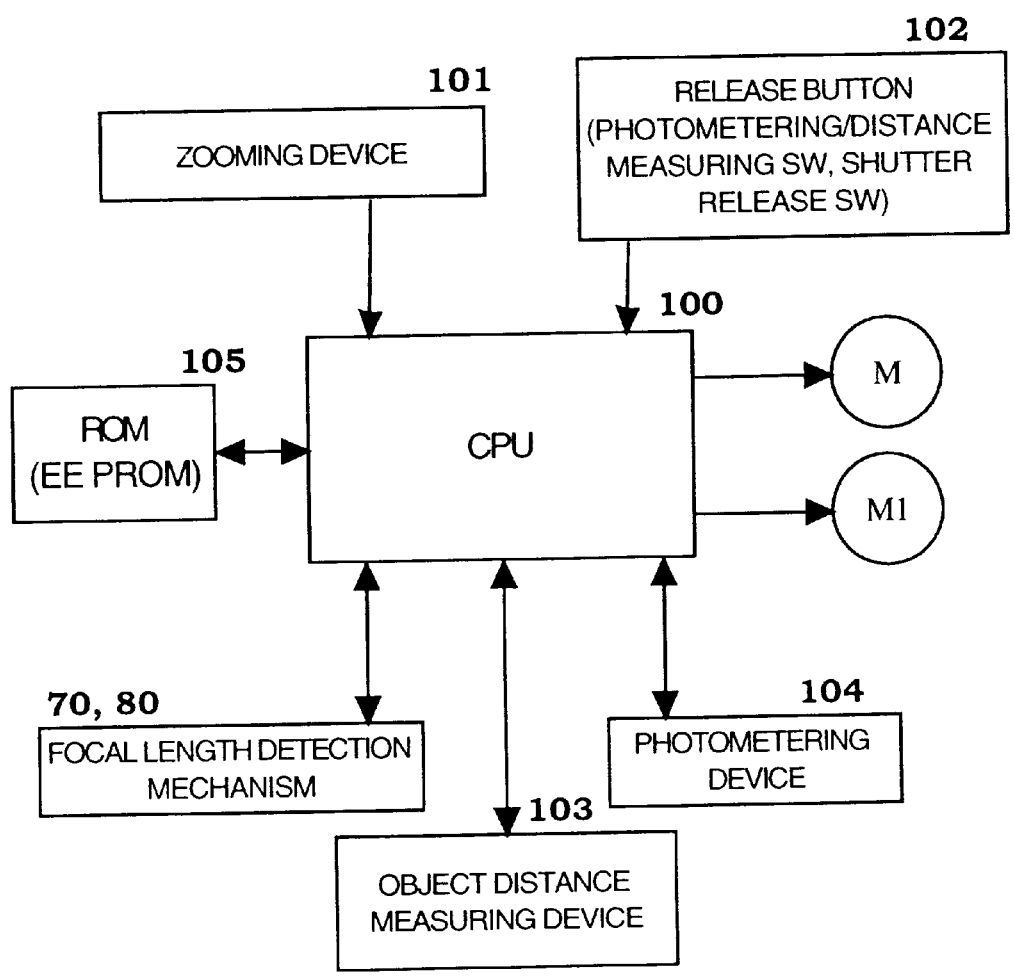
FIG. 7 is a block diagram of a control circuit of a zoom lens camera.

FIG. 7 shows a block diagram of a control circuit of the camera according to an embodiment of the present invention. The zoom lens camera includes a zoom operation device 101, a release button 102, an object distance measuring device 103, and a photometering device (brightness measuring device) 104. These devices (and button) are connected to the CPU 100. The zoom operation device 101 gives a zoom command signal to the zoom lens barrel 10 to move the zoom lens barrel from the telephoto extremity to the wide angle extremity and vice versa and points therebetween. The zoom operation device 101 can be, for example, a momentary switch. The release button 102 is a two-stage switch. When the release button 102 is depressed by half a step, an object distance measuring command signal is generated, and an object brightness measuring command signal is generated to the object distance measuring device 103 and to the photometering device 104, respectively. When the release button 102 is depressed fully, the shutter block 53 is actuated. The shutter block 53 opens the shutter blades 55 for a predetermined time in response to the output of the photometering device 104. Provision is made of a ROM 105 connected to the CPU 100. The ROM 105 can constitute, for example, an EEPROM. The zoom motor M and the focusing motor M1 are controlled by the CPU 100.

The operation of the zoom lens camera constructed as above will be described hereafter. Referring to the flow chart shown in FIG. 8, if a main switch (not shown) provided on the camera is turned ON, the zoom motor M is driven in the feed direction, so that the zoom lens barrel is slightly moved from the retracted position shown in FIG. 1 to the wide angle extremity shown in FIG. 2 (step S1). When the zoom operation device 101 is actuated to issue the movement command to move the barrel from the wide angle extremity toward the telephoto extremity S2), the zoom motor M is rotated further in the feed direction. Consequently, the first outer barrel 17 is rotated and advanced from the stationary barrel 13, and the first linear movement guide ring 20 is moved forward together with the first outer barrel 17 while being linearly guided by the stationary barrel 13. As a result, the drive cam ring 30 is advanced together with the second outer barrel 40 from the first linear movement guide ring 20 while rotating in the same direction as the first outer barrel 17. At the same time, the linear movement of the second linear movement guide ring 33 in the axial direction, together with the drive cam ring 30 occurs. When the rotation of the drive cam ring 30 takes place, the second lens group L2 and the third lens group L3 are moved forward in the optical axis direction while varying the distance between the second and third lens groups L2 and L3 within the second feed barrel, in accordance with the engagement between the guide pins 58 and 59 and the corresponding cam grooves 30*a* and 30*b*. Moreover, the third outer barrel 45 which is linearly guided by the second linear movement guide ring 33 is moved forward in the direction of the optical axis in accordance with the rotation of the drive cam ring 30, so that the first lens group L1 is moved forward relative to the second and third lens groups L2 and L3. If the zoom operation device 101 is actuated to move the barrel from the telephoto extremity shown in FIG. 3 toward the wide angle extremity, the zoom motor M is driven in the retraction direction, so that the zoom lens barrel 10 operates in the opposite way to the above-mentioned operation.

As can be seen from the foregoing, in the three-feed barrel type zoom lens barrel 10, the zooming operation is carried out by varying the distance of the first, second and third lens groups L1, L2 and L3 from the film surface and by varying the distance between the lens groups in combination. The focal length detection mechanism comprised of the brush 70 and the code plate 80 detects in increments the focal length in accordance with the zooming operation (step S3). Namely, the focal length is detected by dividing the focal length into a finite number of steps. Note that even if no zoom operation device 101 is actuated after the main switch is turned ON, focal length data at the wide angle extremity is obtained since the zoom lens barrel 10 is at the wide angle extremity.

If the release button 102 is depressed by a first step (half step) at step S4, the object distance is measured by the object distance measuring device 103 at step S5, the object distance signal (information) is input to the CPU 100, the displacement of the focusing lens group (second lens group L2) is determined based on a displacement obtained from the object distance data and a displacement obtained from the focal length data. In the zoom lens camera according to the present invention, further, the displacement of the focusing lens group is preset (stored), taking into account the zoom adjustment and fB adjustment at each focal length in the finite number of steps. The preset (stored) displacement for focusing is read, and is taken into account to determine the actual displacement of the focusing lens group (step S6). Thereafter, the focusing motor M1 is driven at step S7 in accordance with the displacement determined at step S6, and the second lens group L2 is moved to a position corresponding to the finite number of steps in the optical axis direction to carry out the focusing operation.

The object brightness is also measured by the photometering device 104 when the release button 102 is depressed by half step. Note that the photometering operation takes place at the substantially same time as the measurement of the object distance at step S5.

If the release button 102 is depressed by a second step (full step) at step S8, the shutter blades 55 are opened to perform the exposure operation (step S9).

For example, in the zoom camera mentioned above, in recent years, the focusing lens group has been driven at a finite number of steps of more than 100 latches, so that it is possible to perform zoom adjustment and back focus adjustment via a certain number of such steps. However, if the control including the zoom adjustment and the fB adjustment is carried out only by moving the focusing lens group (i.e., without carrying out any mechanical adjustment), it is impossible to effect the adjustment by only moving the focusing lens group when the positional deviation of the focal point is out of a predetermined adjustment range, or the adjustment range determined by the focusing lens group varies. To this end, it is necessary to make it possible to carry out the control by less displacement of the focusing lens group for a predetermined positional deviation of the focal point in order to relatively increase the adjustable range by the focusing lens group. In the case that the adjustment can be carried out only by the focusing lens, if the number of driving steps of the focusing lens group which can be used for the zoom adjustment and the fB adjustment are few, it is possible to allocate an increased number of driving steps for focusing to enhance the precision of the focusing operation. From the viewpoint of more freedom of design of the focusing-lens surroundings, it is preferable that the displacement of the focusing lens group for the zoom adjustment and the fB adjustment be minimal.

Figure 5:
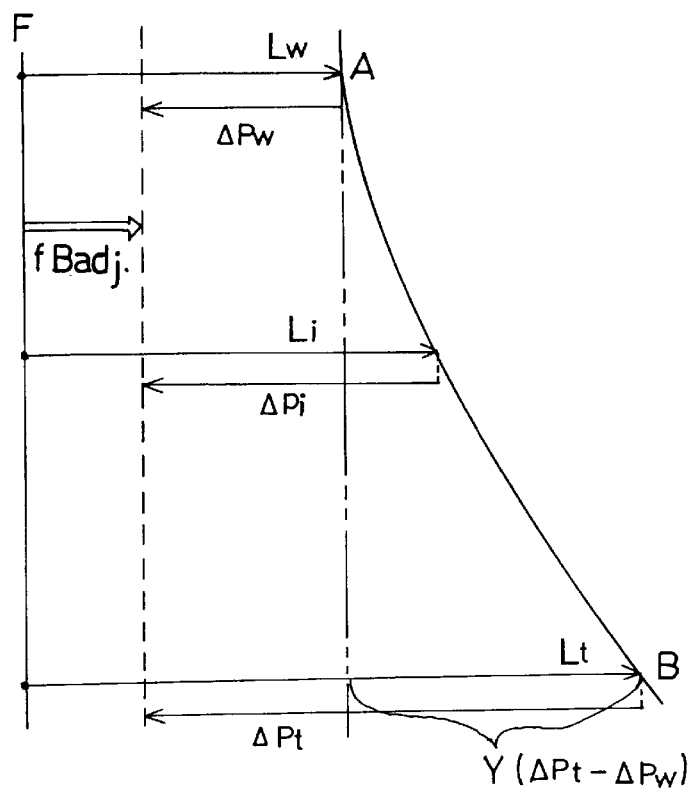
FIG. 5 is a diagram which shows a relationship between a positional deviation of a focal point and an amount of adjustment of focus at each focal length, when the zoom adjustment and the fB adjustment are carried out by the movement of a focusing lens group (a second lens group)
Figure 6:
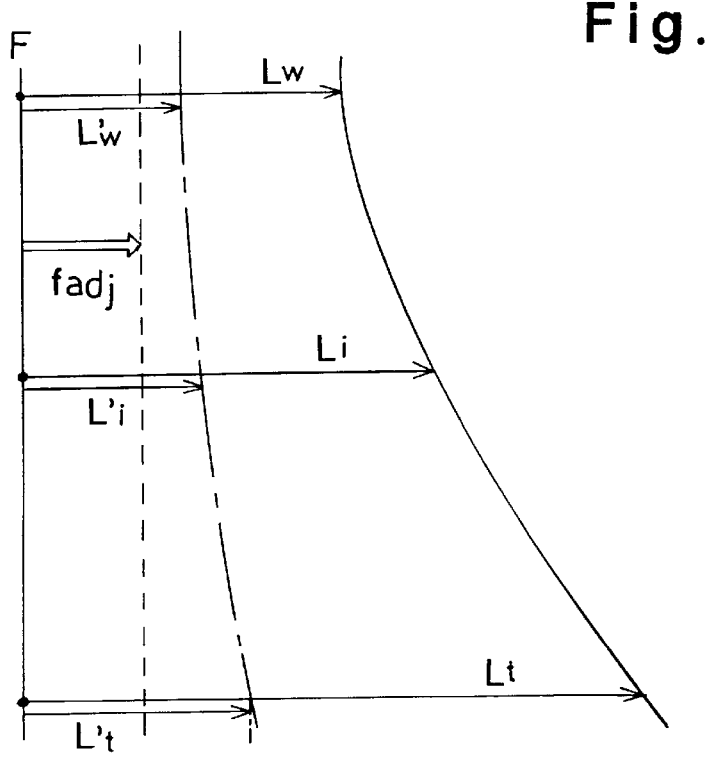
FIG. 6 is a diagram which shows a variation of a positional deviation of a focal point when a lens group (a third lens group) behind a focusing lens group is moved before the focusing lens group is driven.

In the zoom camera mentioned above, the control including the zoom adjustment and fB adjustment is carried out only by the focusing lens group (second lens group L2) as described in FIG. 5. In FIGS. 5 and 6, the abscissa represents the optical axis direction, and the left direction corresponds to the optical forward direction. In the following expressions, negative values represent the displacement (measurement) in the optical forward direction (left direction) and positive values represent the displacement (measurement) in the optical rearward direction (right direction). The ordinate in FIGS. 5 and 6 represents the focal length of the zoom lens barrel, wherein the upward direction corresponds to the wide angle direction (wide angle extremity "w") and the downward direction corresponds to the telephoto direction (telephoto extremity "t"). F designates the position of the focal plane (rail surface) of the camera.

Upon assembly of the zoom lens barrel 10, the positions of the actual focal point of the lens for at least the wide angle and telephoto extremities are measured to obtain differences (deviations) between the positions of the focal points at the wide angle extremity and the telephoto extremity and the position of the focal plane of the camera, for the object of the same object distance. In the zoom adjustment, the focus deviation (difference in the deviation of the focal points from the focal plane) Y between the wide angle extremity and the telephoto extremity is eliminated by moving the second lens group L2 by the adjustment amount Zadj. Zadj is defined as the amount of movement of the second lens group L2 necessary to eliminate the focus deviation Y between the wide angle extremity and the telephoto extremity. Assuming that the deviation between the focal point "A" at the wide angle extremity and the focal plane F of the camera before the zoom adjustment is effected is "Lw" and the deviation between the focal point "B" at the telephoto extremity and the focal plane F of the camera before the zoom adjustment is effected is "Lt", the amount of zoom adjustment can be obtained by the following equation. Note that "Lw" and "Lt" are measured values for each camera:

$$Zadj = -\{(Lt-Lw)/(K2t-K2w)\}$$

Wherein K2w represents focus sensitivity of the focusing lens group at the wide angle extremity, and K2t represents focus sensitivity of the focusing lens group at the telephoto extremity.

As can be seen in FIG. 5, if the focusing lens group is moved by the adjustment amount Zadj obtained by the equation above, the focal points at the wide angle extremity and the telephoto extremity are shifted by $\Delta Pw$ and $\Delta Pt$, respectively, so that they meet with each other. However, the focal points after the zoom adjustment do not meet the focal plane F of the camera. To make the focal points coincident with the focal plane F, the fB adjustment (back focus adjustment) is necessary. Assuming that the displacement of the focal point at the wide angle extremity after the zoom adjustment is $\Delta Pw$, and the displacement necessary to make the focal point coincident with the focal plane F is fBadj, the following equation can be obtained:

$$fBadj = Lw + \Delta Pw = Lw - K2w\{(Lt-Lw)/(K2t-K2w)\}$$

Assuming that the deviation between the focal point and the focal plane F of the camera, at a focal length "i" of the finite number of steps including the wide angle extremity "w" and the telephoto extremity "t" is "Li", and the displacement of the focal point at the focal length "i" after the zoom adjustment is carried out is $\Delta Pi$, respectively, the following equation can be obtained:

$$Li = fBadj - \Delta Pi = Lw + (K2i-K2w)\{(Lt-Lw)/(K2t-K2w)\}$$

Wherein K2i represents the focus sensitivity of the focusing lens group at the focal length "i".

As may be understood from the foregoing, if the focus adjustment is carried out taking into account the zoom adjustment and the back focus adjustment only by the movement of the focusing lens group, the deviation Adji of the focusing lens group at the focal length "i" can be obtained by following equation (1):

$$Adji = -[(Lw/K2i) + \{1-(K2w/K2i)\}\{(Lt-Lw)/(K2t-K2w)\}] \quad (1)$$

Figure 8:
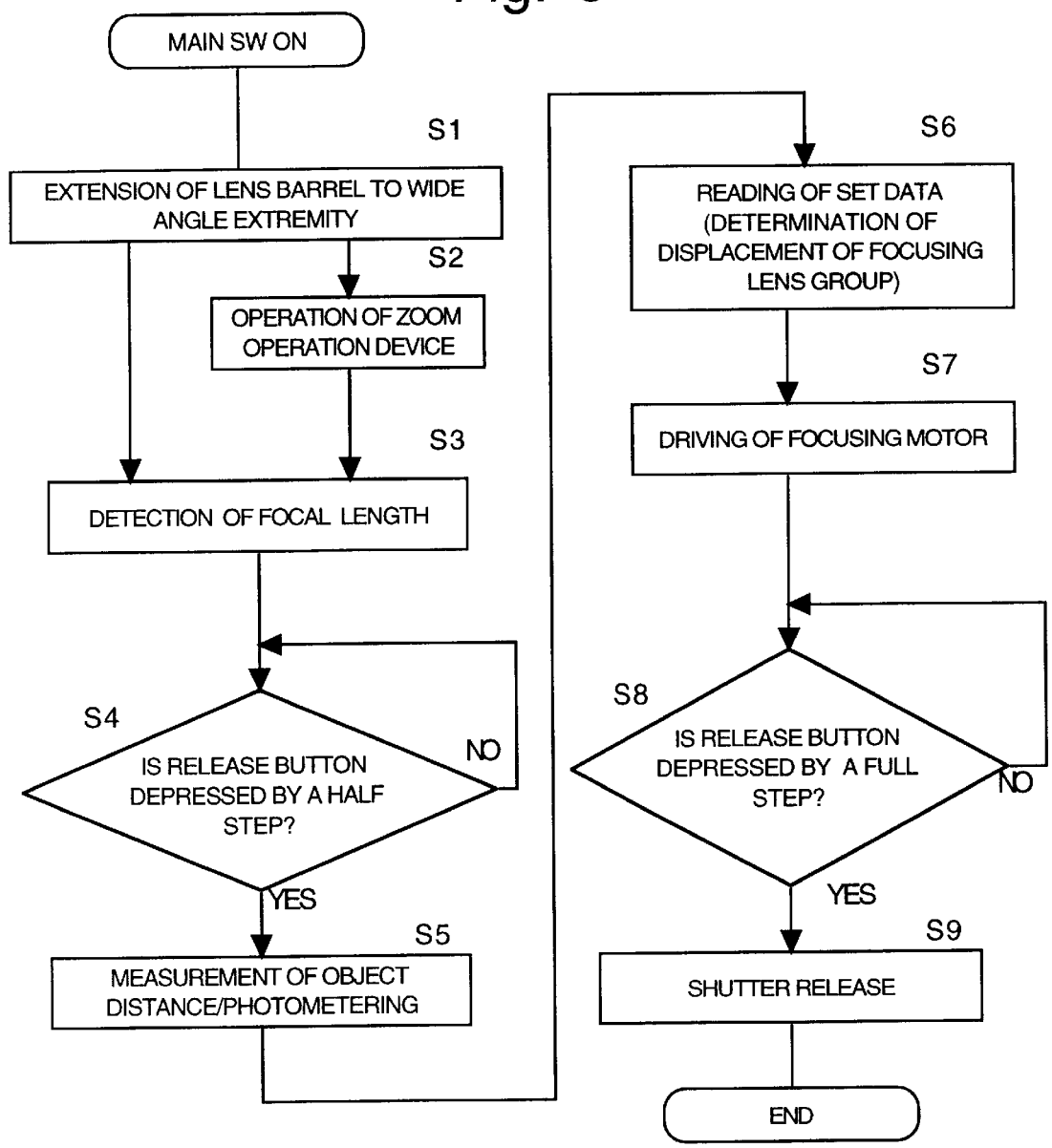
FIG. 8 is a flow chart of a photographing operation of a zoom lens camera.

Sensitivity K2i (including sensitivity K2w at the wide angle extremity and sensitivity K2t at the telephoto extremity) of the second lens group L2 at all focal lengths in the finite number of steps and measured focus deviations (Lw and Lt) from the focal plane F of the camera at the wide angle extremity and the telephoto extremity are stored in advance on ROM 105 as a table data. When the CPU 100 executes a program for activating the camera, the CPU 100 reads the data written on the ROM 105 in advance and moves the focusing lens group L2 taking into account the zooming adjustment and the back focus adjustment as in step S6 in FIG. 8. Thus, the focus adjustment, determined taking into account the zoom adjustment and the back focus adjustment, can be obtained. Namely, the displacement of the focusing lens group (second lens group L2) at each focal length in the finite number of steps can be obtained, taking into consideration the focus sensitivity of the focusing lens group which varies depending on the focal length. The displacement of the focusing lens group thus obtained is stored in the ROM 105. Alternatively, it is also possible, instead of storing Zadj obtained by equation (1) on EEPROM, to calculate the Zadj every time step S6 in FIG. 8 is executed.

Upon focusing, the focusing lens group is moved in accordance with the displacement determined based on the focal length data and the object distance data and the displacement stored in the memory in combination. In this control, no troublesome mechanical adjustment is necessary.

Alternatively, in the zoom camera and its control method as mentioned above, it is possible to move the lens group (third lens group L3) located behind the focusing lens group before the focusing lens group is moved in order to reduce the movement of the focusing lens group. This alternative will be discussed below with reference to FIG. 6.

Upon assembly of the zoom lens barrel 10, the positions of the actual focal point for at least the wide angle and telephoto extremities are measured to obtain differences (deviations) between the positions of the focal points at the wide angle extremity and the telephoto extremity, and the position of the focal plane of the camera. It is assumed that the deviation between the focal point "A" at the wide angle extremity and the focal plane F of the camera is "Lw", and the deviation between the focal point "B" at the telephoto extremity and the focal plane F of the camera is "Lt".

The third lens support frame 49a is supported to move in the optical axis direction with respect to the third lens support ring 49, as mentioned above. Namely, it is possible to change the axial direction of the third lens group L3.

Assuming that the displacement of the third lens group L3 is "x", and the deviation (difference) between the focal point and the focal plane F of the camera after the third lens group L3 is moved is L'i (wherein "i" represents the focal length of the finite number of steps, including the wide angle extremity "w" and the telephoto extremity "t"), the following equation (2) is obtained:

$$L'i = Li - K3i \cdot x \quad (2)$$

Wherein K3i represents focus sensitivity of the third lens group at the focal length "i".

According to equation (2), the deviation (L'w, L't) of each focal point from the focal plane F of the camera at the wide angle and telephoto extremities after the third lens group L3 is moved (by "x") can be obtained in accordance with the focus sensitivity of the third lens group at the wide angle and telephoto extremities. Consequently, the displacement "x" of the third lens group L3 is set so that the difference (L't−L'w) in deviation of the focal point from the focal plane F of the camera at the wide angle and telephoto extremities after the third lens group L3 is moved is less than the difference (Lt−Lw) in deviation of the focal point from the focal plane F of the camera at the wide angle and telephoto extremities before the third lens group L3 is moved. If the axial position of the third lens group L3 is adjusted in accordance with the displacement "x", the same effect as the zoom adjustment can be obtained as indicated by a dotted line in FIG. 6. Namely, the amount of adjustment by the focusing lens group is reduced and hence the movement of the focusing lens group is decreased.

In other words, since the movement of the focusing lens group occurs in an infinite number of steps, if the movement of the focusing lens group necessary to eliminate a certain amount of deviation of the focal point is reduced, the adjustable range of the deviation which can be adjusted by the focusing lens group can be relatively increased. Note that it is not necessary to make the focal point at the wide angle extremity coincident with the focal point at the telephoto extremity by the movement of the third lens group L3.

In the illustrated embodiment, the mechanical adjustment of the position of the third lens group L3 is carried out when the camera having the zoom lens barrel is manufactured. This adjustment is carried out, for example when a variation of the adjustment range of the focusing lens group is corrected or a deviation of the focal point out of the adjustable range of the focusing lens group is corrected. Namely, it is preferable that the adjustment by the third lens group L3 be carried out if it is difficult or impossible to perform the control taking into account the zoom adjustment and the fB adjustment by the focusing lens group only. In particular, in a production line, there is a possibility that the above-mentioned problems continuously occurs on many cameras. In such a case, the mechanical adjustment by the third lens group L3 is extremely useful to curtail the manufacturing cost and facilitate the adjustment.

If the adjustment by the third lens group 13 is carried out upon assembly, the values (L'w, L't) obtained from equation (2) are input as the deviations of the focal point from the focal plane F of the camera at the wide angle extremity and the telephoto extremity. Consequently, the displacement Adj'i of the second lens group L2 determined taking into account the zoom adjustment and the fB adjustment when the third lens group L3 is moved is given by the following equation (3). Note that the focus deviations L'w and L't after the movement of the third lens group L3 are stored in the ROM 105 as measured values for each camera in the illustrated embodiment.

$$Adj'i = -[(L'w/K2i) + \{1 - (K2w/K2i)\}\{(L't - Lw)/(K2t - K2w)\}] \quad (3)$$

In equation (3), the focus deviations "Lw" and "Lt" at the wide angle and telephoto extremities in equation (1) are replaced with L'w and L't, in accordance with the adjustment using the third lens group L3. Therefore, it is possible to store only equation (1) in the memory (ROM 105) even if the mechanical adjustment is carried out by the third lens group L3. The displacement of the focusing lens group at each focal length of the finite number of steps can be obtained via input of the focus deviations L'w and L't at the wide angle and telephoto extremities after the adjustment by the third lens group L3, in place of the focus deviations "Lw" and "Lt". Consequently, displacement data of the focusing lens group corresponding to the focal length obtained by the zoom operation device 101 is read, so that the second lens group (focusing lens group) L2 can be moved in accordance with the control including the zoom adjustment and the fB adjustment. As mentioned above, the displacement of the focusing lens group can be smaller than that when no adjustment by the third lens group L3 is carried out. Thus, the adjustable range by the focusing lens group can be relatively increased, thus resulting in an increase in the precision of the focus adjustment.

Figure 9:
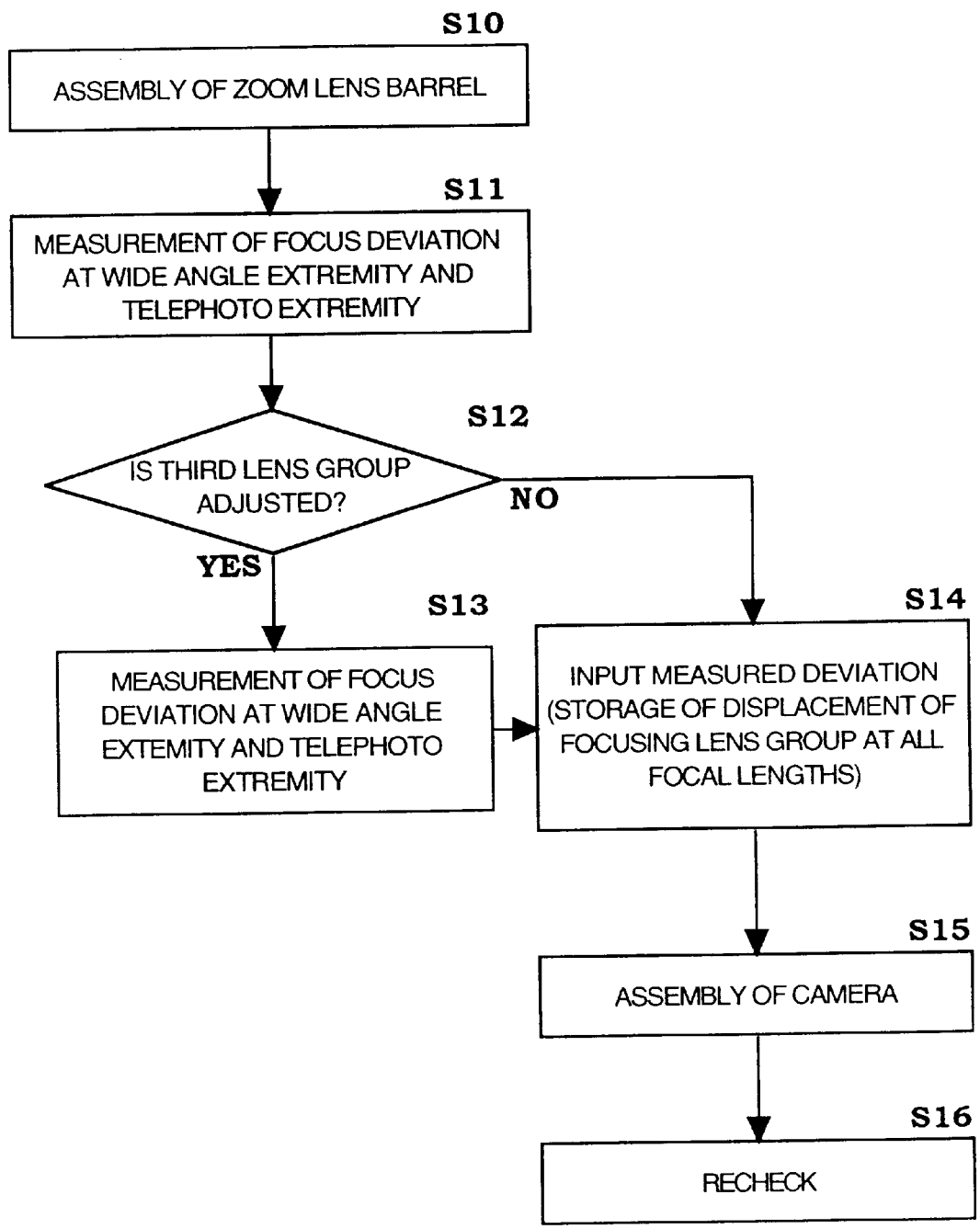
FIG. 9 is a flow chart of a manufacturing process of a zoom lens camera.

The production process of the zoom lens camera is shown in the flow chart of FIG. 9 by way of example. The zoom lens barrel 10 is assembled (step S10), and thereafter the positions of the actual focal point for at least the wide angle and telephoto extremities are measured to obtain differences (deviations) between the positions of the focal points at the wide angle and telephoto extremities and the position of the focal plane of the camera (step S11). If necessary, the adjustment by the third lens group L3 is effected (step S12). Whether adjustment of the third lens group L3 is necessary or not is determined as follows: The third lens group L3 is positioned at a predetermined reference position at step S10 in FIG. 8 upon assembly. Thereafter, the deviation (difference in the deviation of the focal points from the focal plane) Y between the wide angle extremity and the telephoto extremity is measured at step S11. If the deviation exceeds a predetermined value, which means that adjustment by the focusing lens group L2 only might cause focusing error, it is determined that the adjustment by the third lens group L3 is necessary. After the positional adjustment of the third lens group L3 is executed, the process proceeds to step S13.

If the adjustment by the third lens group L3 is carried out, the focal deviations at the wide angle extremity and the telephoto extremity are measured again (step S14). Since the focus deviations of the actual focal point from the focal plane of the camera at the wide angle and telephoto extremities are obtained by the measurement at step S11 or S13, regardless of the adjustment by the third lens group L3, the measured values are stored in the ROM 105. The equations mentioned above and the focus sensitivity of the focusing lens group at all focal lengths are written in the CPU 100. The measured values are replaced with the displacements of the focusing lens group at all focal lengths and are stored in the memory (step S14). Thereafter, the camera is completely assembled (step S15) and the deviations of the focal point from the focal plane of the camera are rechecked (step S16). In the zoom lens camera thus produced, it is possible, upon focusing, to move the focusing lens group taking into account the zoom adjustment and the fB adjustment.

As can be understood from the above discussion, according to the present invention, the focus deviation at the wide angle and telephoto extremities can be measured without carrying out a mechanical zoom adjustment or fB adjustment, and the calculation results based on the measurement are input. Consequently, upon focusing, the movement of the focusing lens group can be controlled taking into account the zoom adjustment and the fB adjustment.

Moreover, if a mechanism which adjusts the position of a rear lens group located behind the focusing lens group is provided, the displacement of the focusing lens group for a predetermined focus deviation can be reduced by adjusting the position of the rear lens group prior to the movement of the focusing lens group. Therefore, it is possible to increase the number of the drive steps of the focusing lens group for the focusing operation to thereby enhance the accuracy of the focus adjustment. Moreover, even if the focus deviation is out of the predetermined adjustable range by the focusing lens group, the focus deviation can be compensated. Furthermore, if the displacement of the focusing lens group is reduced, the space for the movement of the focusing lens group can be made small, so that freedom of design can be increased.

If the rear lens group (third lens group L3) behind the focusing lens group is moved for the focus adjustment, since the movement is aimed at the reduction of the displacement of the focusing lens group to some extent rather than completely compensating the variation of the focus deviation between the wide angle extremity and the telephoto extremity, no precise adjustment is needed. Therefore, the adjustment is less troublesome and easier than the mechanical adjustment in the prior art.

The present invention can be applied to a zoom lens barrel other than the three lens group type of zoom lens barrel.

As may be understood from the foregoing, according to the present invention, upon focusing, the focusing lens can be driven in accordance with a control taking into account the zoom adjustment and the fB adjustment without a mechanical zoom adjustment or fB adjustment. Consequently, the focusing can be easily carried out. Moreover, in the case that the rear lens group behind the focusing lens group is mechanically adjustable, the focus control can be carried out, taking into account the zoom adjustment and fB adjustment by less displacement of the focusing lens group if the position of the rear lens group is mechanically adjusted prior to the movement of the focusing lens group. Consequently, not only can the focus adjustment be easily carried out, but also the precision of the adjustment can be increased. Moreover, freedom of design of the surroundings of the focusing lens group can be enhanced.

What is claimed is:

1. A control method for a zoom lens camera comprising:
   a zoom lens system comprising at least two variable power lens groups, wherein one of said variable power lens groups being provided on the object side functioning as a focusing lens group;
   a focal length detection mechanism which detects the focal length of said zoom lens system by dividing said focal length into a finite number of steps; and
   a focus drive mechanism which drives said focusing lens group to selectively move the focusing lens group to a finite number of steps;
   said method comprising:
   measuring actual focal points of said zoom lens system at least at the wide angle extremity and the telephoto extremity upon assembly, whereby any deviations of the measured said focal points from a focal plane of said zoom lens camera in an optical axis direction are obtained;
   converting the deviations in the optical axis direction to a displacement of said focusing lens group at each focal length of said finite number of steps, taking into account the focus sensitivity of said focusing lens group which varies depending on the focal length of said zoom lens system, wherein the data of said displacement is stored in a memory; and
   driving said focusing lens group, upon focusing, by said focus drive mechanism in accordance with the displacement of said focusing lens group determined based on object distance data and focal length data, in addition to the stored displacement data.

2. A control method for a zoom lens camera according to claim 1, wherein said zoom lens camera comprises a mechanism which mechanically adjusts the position of a rear lens group, said rear lens group being one of said two lens groups and being provided behind said focusing lens group, and wherein said control method comprises an additional step between said converting step and said driving step in which the position of said rear lens group is adjusted.

3. A control method for a zoom lens camera according to clam 2, wherein the position of said rear lens group is adjusted so that the displacement data of said focusing lens group which is stored at said converting step is reduced.

4. A control method for a zoom lens camera according to claim 1, wherein said zoom lens system comprises a first, second and third lens group, in which said second group and said third lens group comprise said focusing lens group and said rear lens group, respectively.

5. A zoom lens camera comprising:
   a zoom lens system comprising at least two variable power lens groups, one of said variable power lens groups being provided on the object side functioning as a focusing lens group;
   a focal length detection mechanism which detects said focal length of said zoom lens system which is divided into a finite number of steps;
   a focus drive mechanism which drives said focusing lens group to selectively move the focusing lens group to a finite number of steps;
   a memory in which measured deviations of the actual focal points of said zoom lens system, upon assembly, at least at the wide angle extremity and the telephoto extremity from a focal plane of said zoom lens camera are stored;
   a calculation device for converting the measured deviations of said actual focal points from said focal plane of said zoom lens camera in an optical axis direction into a displacement of said focusing lens group at each focal length of said finite number of steps, taking into account a focus sensitivity of said focusing lens group which varies depending on said focal length of said zoom lens system; and
   a control device for causing said focus drive mechanism to drive said focusing lens group, upon focusing, in accordance with the displacement data of said focusing lens group obtained by said calculation device in addition to the displacement data of said focusing lens group determined based on focal length data and object distance data.

6. A zoom lens camera according to claim 5, further comprising a mechanism which mechanically adjusts the position of a rear lens group, said rear lens group being one of said two lens groups and being provided behind said focusing lens group.

7. A zoom lens camera according to claim 6, wherein said rear lens group comprises a lens group which is closest to an aperture, said aperture defining an exposure area to a film.

8. A zoom lens camera according to claim 7, further comprising a lens frame which supports said rear lens group, said lens frame comprising, on an outer periphery thereof, a male thread, and a lens support ring which is provided on an inner periphery thereof with a female thread; said female thread engaging with said male thread, wherein the position of said rear lens group is adjustable via the rotation of the lens frame.

9. A zoom lens camera according to claim 8, wherein said lens frame is provided on an outer periphery thereof with a plurality of engaging portions to which a rotatable jig is engaged to rotate the lens frame.

10. A zoom lens camera according to claim 5, wherein said zoom lens system comprises a first, second and third lens group, in which said second group and said third lens group comprise said focusing lens group and said rear lens group, respectively.

11. A control method for a zoom lens camera including a zoom lens system comprising a first, a second and a third lens group in this order from the object side, said second lens group functioning as a focusing lens group; a focal length detection mechanism which detects the focal length of said zoom lens system by dividing said focal length into a finite number of steps; and a focus drive mechanism which drives said focusing lens group to selectively move said focusing lens group to a finite number of steps;

said method comprising:

a first step in which actual focal points of said zoom lens system at least at the wide angle extremity and the telephoto extremity are measured upon assembly, and the deviations of the measured said focal points from a focal plane of said zoom lens camera in an optical axis direction are obtained;

a second step in which the deviations in the optical axis direction are converted to a displacement of said focusing lens group at each focal length of said finite number of steps, taking into account the focus sensitivity of said focusing lens group which varies depending on the focal length of said zoom lens system and the data of said displacement is stored in a memory; and a third step in which, upon focusing, said focusing lens group is driven by said focus drive mechanism in accordance with the displacement of said focusing lens group determined based on object distance data and focal length data, in addition to the stored displacement data.

12. A control method for a zoom lens camera according to claim 11, wherein said zoom lens camera comprises a mechanism which mechanically adjusts the position of said third lens group, and wherein said control method comprises an additional step between said second and third step in which the position of said third lens group is adjusted.

* * * * *